Jan. 16, 1945.  E. ROMANELLI ET AL  2,367,617
METHOD AND APPARATUS FOR HEAT TREATMENT
Filed April 9, 1941  2 Sheets-Sheet 1

INVENTORS
E. ROMANELLI
F. E. SUTTER
BY
ATTORNEY

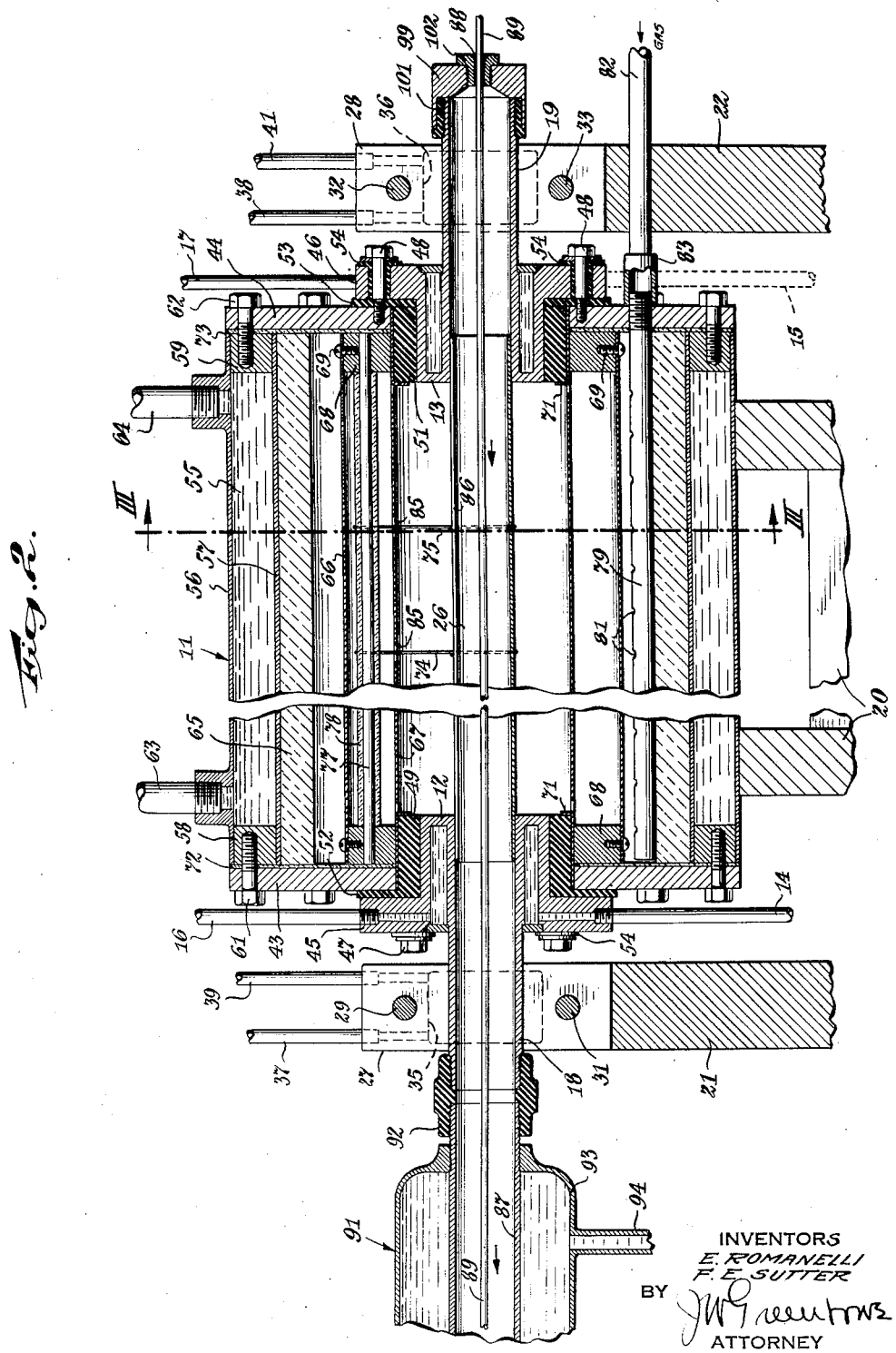

Patented Jan. 16, 1945

2,367,617

UNITED STATES PATENT OFFICE 2,367,617

METHOD AND APPARATUS FOR HEAT TREATMENT

Emilio Romanelli, Bloomfield, and Frederic E. Sutter, West Caldwell, N. J., assignors to Westinghouse Electric & Manufacturing Company, East Pittsburgh, Pa., a corporation of Pennsylvania Application April 9, 1941, Serial No. 387,648

12 Claims. (Cl. 263—40)

This invention relates to a method and apparatus for heat treating refractory metals, such as tungsten and molybdenum, and more particularly the construction and use of a special furnace for continuous heat treatment of metal rods or wire larger than 100 mils at temperatures above 2000° C., although we do not wish to limit ourselves, as it may be used for material of smaller sizes.

The principal object of our invention, generally considered, is to provide for treating refractory metals, such as tungsten and molybdenum in order to give them the desired physical structure.

Another object of our invention is to provide a furnace adapted for the reception and treatment of refractory metal rods of indefinite length which may be passed continuously therethrough.

A further object of our invention is to treat refractory metal rods to produce a uniform metal structure throughout the entire length.

A still further object of our invention is to treat rods or slugs of refractory metal, such as tungsten, without loss of untreated end portions.

An additional object of our invention is the provision of a heat-treating furnace in which a refractory metal tube has a sliding connection with water-cooled headers, annular end members being secured to said headers, and a water cooled cylindrical jacket extending between peripheral portions of said end members to complete the enclosure, means being provided for passing electric current through said tube to heat the same and for introducing hydrogen into the chamber provided to prevent oxidation of the refractory metal and heated parts of the furnace during treatment.

Other objects and advantages of the invention, relating to the particular arrangement and construction of the various parts, will become apparent as the description proceeds.

Referring to the drawings illustrating our invention:

Figure 2 is a fragmentary enlarged longitudinal sectional view of the furnace shown in Figure 1.

Figure 1:
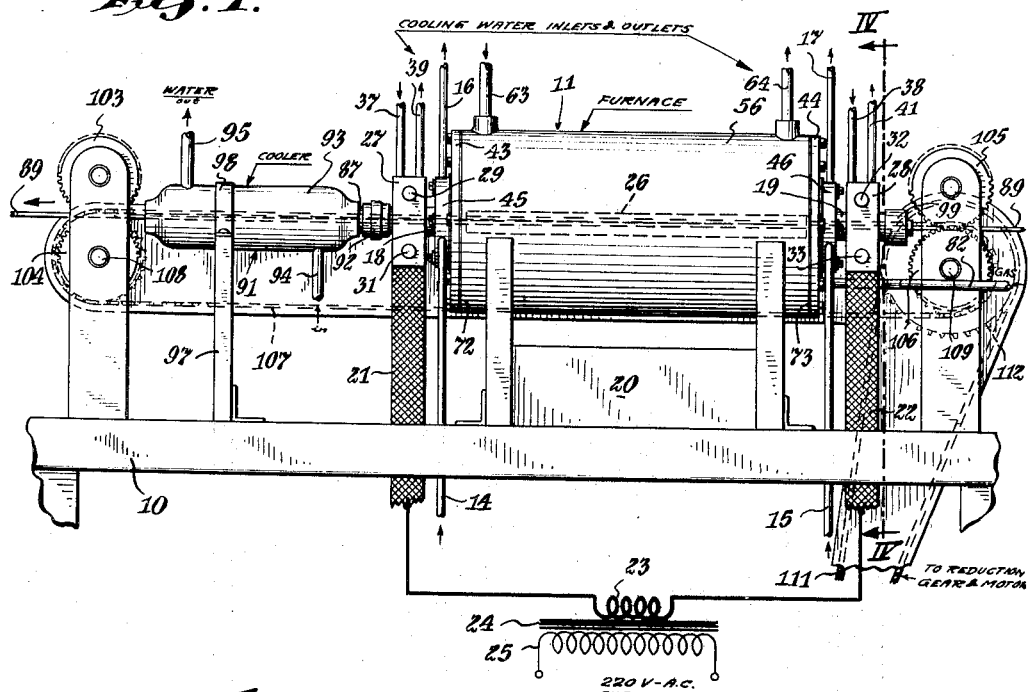
Figure 1 is a side elevational view of one embodiment of our furnace and associated apparatus, the means for energizing the furnace being diagrammatically shown.

In the hot processing of tungsten and other refractory metals for manufacturing wire, between the time the slugs are first sintered and the material passed through dies for drawing to the desired size, it is necessary to heat treat after a certain amount of deformation. In accordance with previous practice, a refractory rod to be heat treated, was clamped between electrical contacts, such as shown, for example, in the Iredell et al. Patent No. 2,215,645, dated September 24, 1940, and a definite strength of electric current passed through the rod while protected by a hydrogen atmosphere, so as to bring it to a temperature sufficiently high for such a length of time that the material was given the desired physical structure.

The disadvantages of such a method were that the ends of the rod did not get the desired heat treatment and had to be broken off and discarded, and the method was not continuous. That is, a rod was treated, the apparatus was allowed to cool, and the rod removed and replaced by another to be treated.

In accordance with our invention, a furnace is provided where the material to be treated may be fed thereto continuously as a long rod of indefinite length, and the speed adjusted so that each portion of the rod is in the furnace and subjected to the desired temperature for the necessary length of time to accomplish the purpose. The rod then passes continuously through an adjacent cooling chamber before reaching the atmosphere, whereby it is prevented from oxidation while hot.

Referring to the drawings, like parts being designated by like reference characters, there is shown a furnace, generally designated as 11, held above the floor or supporting element 10 by frame or pedestal 20. Furnace energizing means, consisting of a pair of headers 12 and 13 cooled during operation of said furnace by fluid, such as water, admitted thereto through inlet pipes 14 and 15, and withdrawn therefrom through outlet pipes 16 and 17, are provided. The headers have hollow cylindrical portions 18 and 19 extending outwardly therefrom and to which electrical energy may be introduced by means of heavy conductors 21 and 22 from the secondary winding 23 of a transformer 24, the primary winding 25 of which may receive power from a conventional source of electrical energy, such as 220 volt alternating current supply.

The heating element 26 of the furnace extends directly between the headers 12 and 13, having a tight but sliding connection therewith to allow for expansion and contraction as the temperature changes.

It is desirably formed as a tungsten tube made by rolling down to .060″ in thickness, a sintered tungsten bar of the proper width so that when the sheet is formed into a round tube, a gap of 1/16 inch, longitudinally, is left. This will permit the tube to be wired and compressed on an arbor slightly smaller than the internal diameter of the tube. When the ends are then ground to the exact diameter of bore of the terminals. By this means, the tube will exert a radial pressure when removed from arbor and inserted into the terminals and thus assure good contact while permitting a sliding action during the heating and cooling periods.

The power supply is such as to provide a current high enough to raise the heating tube 26 to a temperature above 2000° C. Not only are the headers 12 and 13 water cooled, but the contact devices 27 and 28, which connect the furnace ends of the conductors 21 and 22 to the extensions 18 and 19, which devices may be clamped to said extensions by means of bolts 29, 31, 32 and 33 and associated nuts 34, are formed hollow, as indicated at 35 and 36, and are kept cool by circulating fluid, such as water, in pipes 37 and 38 and out of pipes 39 and 41.

The furnace enclosure is provided by securing annular end plates 43 and 44, which may be of cast iron or the like, to outstanding flanges 45 and 46 of the headers 12 and 13 by tap bolts 47 and 48. Short circuiting between the headers, through the members 43 and 44, is prevented by the use of cylindrical insulators 49 and 51 fitting over said headers. Annular insulators 52 and 53 are disposed between the flanges 45 and 46 and the respective annular members 43 and 44 and insulators 49 and 51. The shanks and heads of the bolts 47 and 48 are similarly insulated by flanged cylindrical insulators 54. All of the foregoing insulators may be made of alundum or other electrical insulating material.

The annular end plates 43 and 44 have their peripheral portions joined by a hollow cylindrical water jacket 55, formed of concentric cylindrical copper plates 56 and 57, the adjacent end portions of which are welded or otherwise secured to annular closure rings 58 and 59, which are in turn threaded to receive tap bolts 61 and 62 for connection with the annular end plates 43 and 44. Cooling water is introduced to the water jacket 55 through pipe 63 and withdrawn by pipe 64.

In order to conserve the heat, a hollow cylindrical heat insulator 65 is provided to line the water jacket between the end plates 43 and 44. This insulation may consist of asbestos, magnesia, or other approved high temperature insulation.

In order to further conserve the heat, there are provided coaxial cylindrical reflectors 66 and 67, formed of bright molybdenum or other suitable material. The outer ends of the reflector 66 are desirably secured to copper clamp rings 68, as by means of screws 69, and the inner cylindrical member 67 is desirably held in place by striking lugs 71 inwardly therefrom, to abut the insulators 51, thereby keeping them also in the desired positions. The inner surfaces of the end plates 43, are desirably faced with heat-insulating sheets 72 and 73, formed of transite or similar heat-resisting material.

Figure 3:
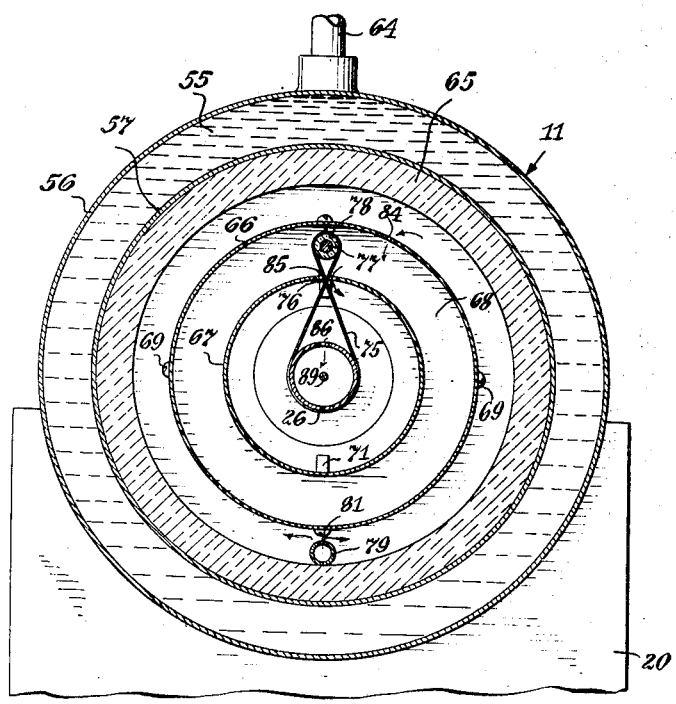
Figure 3 is a transverse sectional view on the line III—III of Figure 2, in the direction of the arrows.
Figure 4:
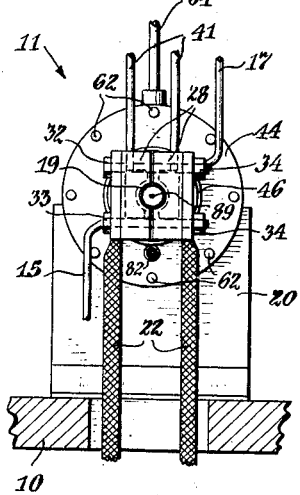
Figure 4 is a transverse sectional view on the line IV—IV of Figure 1 in the direction of the arrows.

In order to prevent sagging of the refractory metal tube 26 when the same is heated to high temperatures, the same is supported intermediate its ends by molybdenum or tungsten wires 74 and 75, passing therearound, crossing one another as indicated at 76 in Figure 3, and then passing over molybdenum supporting rod 77 protected by ceramic insulating supporting tube 78, and having its ends received in corresponding apertures in the copper clamp rings 68.

Hydrogen or other protective gas is introduced into the heating chamber formed as described, by pipe 79, formed with a plurality of apertures 81, and with its outer end projecting through the end member 44 and united to supply pipe 82, as by means of union 83. The gas from the pipe 82 is allowed to diffuse into the interior of the heating element 26 after first passing through apertures 84 in the member 66, then through apertures 85 in the member 67, and finally through the longitudinal slit 86 in the heating element 26, from whence it may pass out of the apparatus, partly through the cooling tube 87 and partly through the inlet aperture 88 around the rod of refractory metal 89 which is being treated.

In order to cool the metal undergoing treatment before the same is allowed to reach the atmosphere and thereby prevent its oxidation, a cooling device 91 is provided in line with the furnace 11 and connected to the cylindrical portion 18 by means of an insulating union 92. The cooling apparatus 91 may be formed simply by surrounding the tube 87 with a water jacket formed of a cylindrical shell 93, the ends of which are threaded to the end portions of the cooling tube 87, and which is supplied from inlet pipe 94 with cooling liquid, such as water, which passes out of the compartment so formed through outlet pipe 95. The cooling device may be held above the floor or supporting element 10 by pedestals 97 between which a securing strap 98 passes after partly encircling the cooler.

The inlet end of the apparatus is provided with a cap 99, provided with an insulating bushing 101 threadably secured to the extension 19 and provided with a hard or wear-resisting central bushing 102, apertured to closely receive the rod 89 of refractory metal to be treated. The outlet end of the apparatus may be similarly constructed, except that there is no need of insulation.

The rod of refractory metal 89 is desirably pushed through the furnace and cooler by rollers 105 and 106 at the inlet end and drawn through the furnace and cooler by rollers 103 and 104 at the outlet end, suitably geared together as illustrated in Figure 1. The outlet rollers 103 and 104 are driven as by means of a belt or sprocket chain 107 between pulleys or sprocket wheels respectively secured to the shafts 108 and 109 and carrying the rollers 104 and 106. All of the rollers may be driven from a suitable source of power, such as an electric motor (not shown), through reduction gearing and belt or sprocket chain 111 to the pulley or sprocket wheel 112, mounted on the shaft 109.

The apparatus described may be operated as follows:

Hydrogen or other protective gas is admitted through the pipe 82 to flush out the atmosphere initially present therein. The heating element 26 is then raised to the desired temperature by energization from the transformer 24. The motor is then started to draw the rod 89 through the furnace and cooler, in the direction indicated by the arrows in Figure 2, the speed of motion thereof being so adjusted that it receives the desired heat treatment, and is then cooled sufficiently before passing out again into the atmosphere to avoid undesired oxidation.

From the foregoing it will be seen that we have provided a method and apparatus for continuously treating rods of refractory metal, such as tungsten and molybdenum, in a uniform manner, whereby not only is the entire length treated without loss of a substantial proportion of the material, as when short lengths were treated as heretofore, but a more uniform product is obtainable by virtue of the control exercised over the process. It will also be seen that we have evolved a very efficient furnace for heat treatment in which heat is conserved by two reflectors and one insulating cylinder, outside of which is a water jacket to prevent danger to an operator by contact with a hot exterior.

Although a preferred embodiment of our invention has been disclosed, it will be understood that modifications may be made within the spirit and scope of the appended claims.

We claim:

1. A furnace for temperatures higher than 2000° C., comprising a refractory metal tube, conductive water cooled headers in which end portions of said tube are slidably received, annular end members secured to said headers, and a cylindrical jacket extending between the peripheries of said end members.

2. A furnace for temperatures higher than 2000° C., comprising a tube of tungsten slit from end to end to allow for radial expansion and permit treating gas to diffuse thereinto, conductive water cooled headers in which end portions of said tube are slidably received, annular end members secured to said headers, and a cylindrical jacket uniting peripheral portions of said end members.

3. Apparatus for treating refractory metal, comprising a furnace consisting of a refractory metal tube, conductive headers in which the end portions of said tube are slidably received, annular end members secured to said headers, a cylindrical jacket uniting peripheral portions of said end members, one of said headers having a cylindrical projection coaxial with said tube and extending therefrom, and a cooling chamber directly connected to said extension.

4. Apparatus for treating refractory metal comprising a furnace, a heating element therein consisting of a refractory metal tube, conductive headers in which end portions of said tube are slidably received, annular end members secured to said headers, a jacket connecting peripheral portions of said end members, a rod extending between and supported on said headers, and means depending from said rod for supporting intermediate portions of said tube.

5. Apparatus for treating refractory metal comprising a tungsten tube, conductive water cooled headers in which the end portions of said tube are slidably received, annular end members secured to said headers, a cylindrical jacket extending between peripheral portions of said headers to complete the enclosure, an insulating cylinder disposed between each header and its annular member, a metal clamping ring supported on each cylinder between said end members, a refractory metal rod extending above said tube between said rings, a ceramic tube mounted on said rod, and supporting wires extending from said ceramic tube to said heating tube.

6. A furnace for temperatures higher than 2000° C. comprising a refractory metal tube, conductive water-cooled headers in which the end portions of said tube are slidably received, said headers having hollow projections, coaxial with said tube, extending outwardly therefrom, and means for introducing current to said headers, comprising hollow contact clamps bolted around said extensions, and means for admitting cooling fluid to, and withdrawing it from the interior of said clamps.

7. A furnace for temperatures higher than 2000° C. comprising a refractory metal tube, conductive water-cooled headers in which the end portions of said tube are slidably received, annular end members secured to said headers, an outer jacket extending between peripheral portions of said end members, and bright metal cylinder means coaxial with said tube and surrounding the same inside of said enclosure for conserving the heat thereof.

8. A furnace for temperatures higher than 200° C. comprising a refractory metal tube, conductive headers in which the end portions of said tube are slidably received, annular end members secured to said headers, a cylindrical jacket extending between peripheral portions of said end members, and a pipe passing through one of said members and extending nearly to the other, disposed between said jacket and tube, and provided with apertures therealong for admitting treating gas.

9. A furnace for temperatures higher than 2000° C. comprising a refractory metal tube, conductive headers with outstanding flanges and in which the end portions of said tube are slidably received, cylindrical insulating means mounted on said headers, annular end members mounted on said insulating means, securing devices extending between said outstanding flanges and end members, insulating means between said securing devices and flanges, and a cylindrical cover extending between peripheral portions of said end members.

10. A furnace for temperatures higher than 2000° C. comprising a refractory metal tube, conductive headers in which the end portions of said tube are slidably received, one of said headers having a hollow projection coaxial with said tube, a cap threadably secured to said extension, a hardened bushing secured to the central portion of said cap, said bushing having an aperture to receive a rod undergoing treatment, and power means for driving said rod through said aperture and into and through said furnace.

11. In a furnace for high temperatures, in combination with a pair of headers adapted to convey electric power and formed with cylindrical openings, a tube of tungsten slit to allow for resilient radial variation and diffusion of gas thereinto, with opposite end portions slidably received in said cylindrical openings, and exerting radial pressure on said headers so as to function as a resistance heating element.

12. In a furnace for high temperatures, in combination with a pair of headers adapted to convey electric power and formed with cylindrical openings, a tube of a highly refractory Group VI metal, longitudinally slit to allow for resilient radial variation, the opposite end portions of said tube fitting said cylindrical openings and slidably engaging and exerting radial pressure on said headers, so as to make good contact therewith and function as a resistance heating element.

EMILIO ROMANELLI.
FREDERIC E. SUTTER.